W. T. GIBBS.
SEED PLANTER.
APPLICATION FILED MAY 9, 1908.

899,039.

Patented Sept. 22, 1908.
2 SHEETS—SHEET 1.

Witnesses

Inventor
William T. Gibbs
By Chandler & Chandler
Attorneys

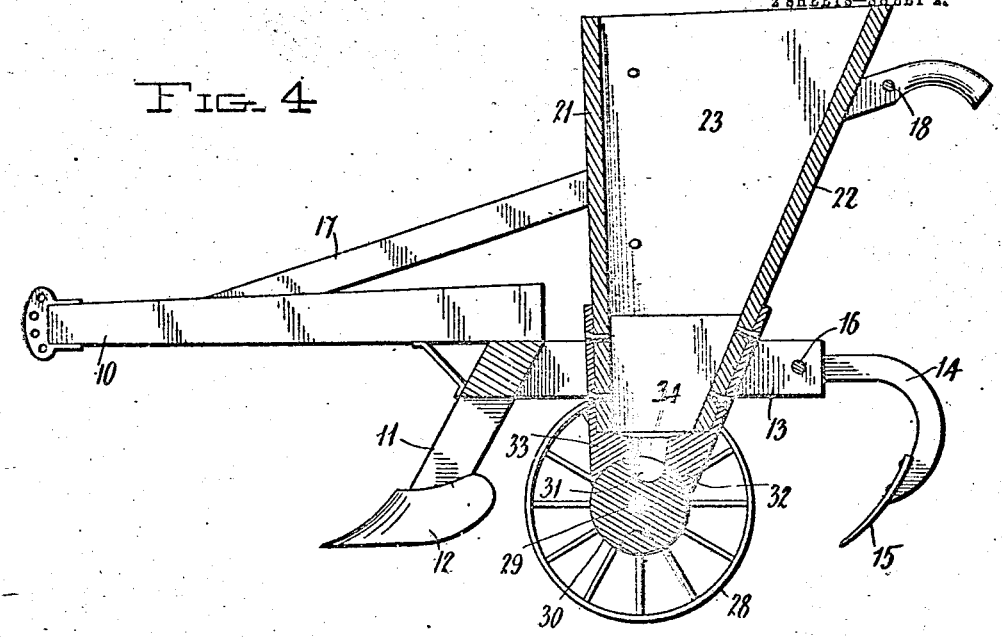
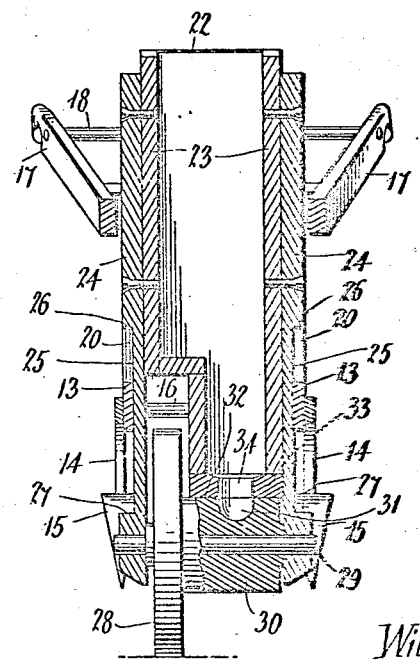

UNITED STATES PATENT OFFICE.

WILLIAM T. GIBBS, OF LOUISVILLE, GEORGIA.

SEED-PLANTER.

No. 899,039.

Specification of Letters Patent.

Patented Sept. 22, 1908.

Application filed May 9, 1908. Serial No. 431,975.

*To all whom it may concern:*

Be it known that I, WILLIAM T. GIBBS, a citizen of the United States, residing at Louisville, in the county of Jefferson, State of Georgia, have invented certain new and useful Improvements in Seed-Planters; and I do hereby declare the following to be a full, clear, and exact description of the invention, such as will enable others skilled in the art to which it appertains to make and use the same.

This invention relates to seed planters.

The primary object of the invention is to provide a seed planter having a hopper which is freely movable vertically so that a furrow of a constant depth may be plowed without interference by the hopper or rather its supporting wheel.

Heretofore, hoppers of seed planters have been fixedly mounted upon the planter frame so far as I am advised but such a construction is undesirable inasmuch as the wheel for rotating the distributing barrel of the planter and which rotates at the lower end of the hopper, travels over the inequalities in the surface of the ground and tends to raise the hopper and lower it during travel of the machine. It is desirable however that this disadvantage be over come and that the furrow opener of the planter be permitted to travel through the soil at a constant depth and in carrying out my invention I aim to accomplish this result.

Figure 1:
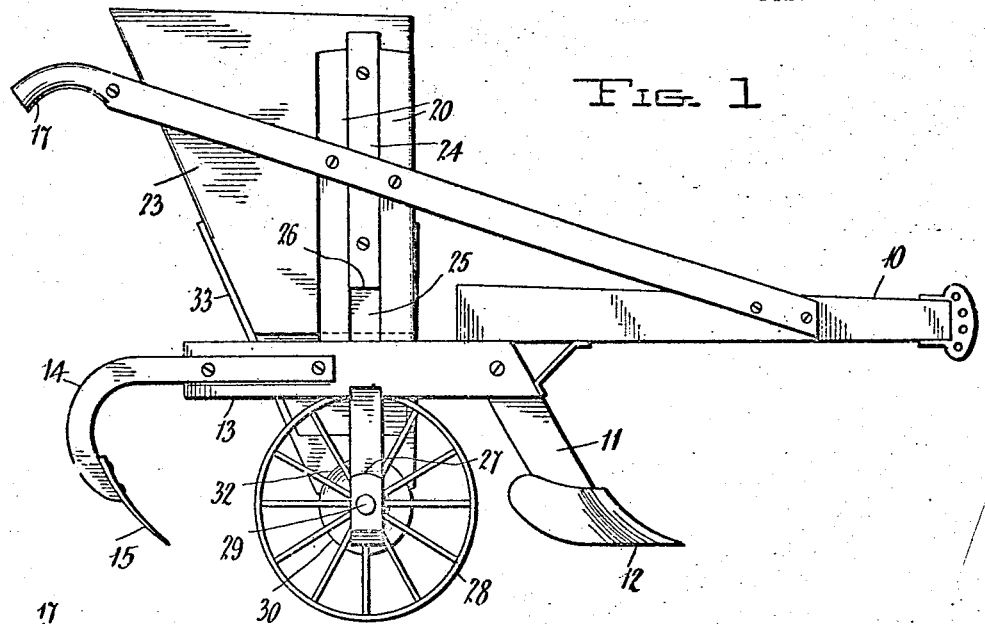
Figure 2:
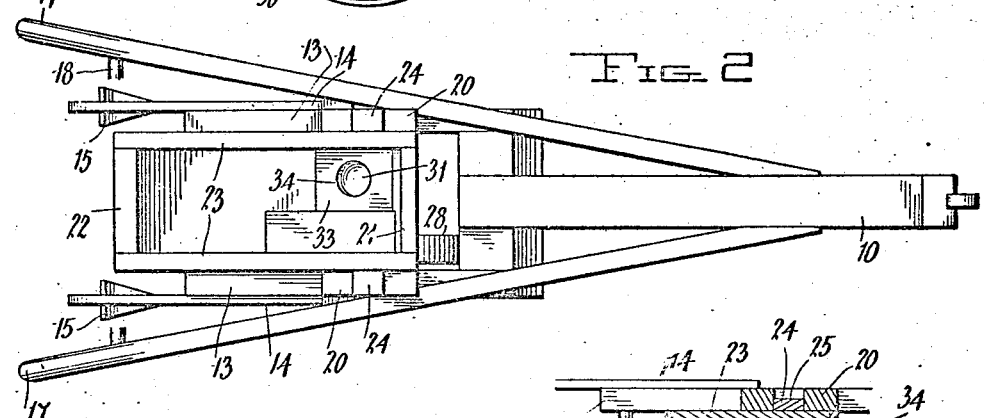
Figure 3:
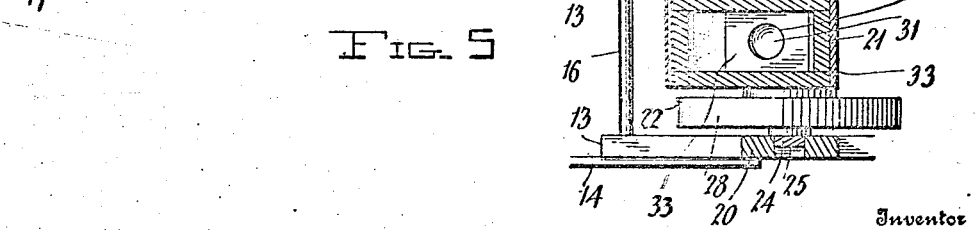

In the accompanying drawings, Figure 1 is a side elevation of the improved seed planter. Fig. 2 is a top plan view, Fig. 3 is a vertical transverse sectional view, Fig. 4 is a vertical longitudinal sectional view, and, Fig. 5 is a horizontal sectional view.

As shown in the drawings, the planter embodying my invention comprises a draft beam 10 at the rear end of which is formed or secured a plow standard 11 at the lower end of which is attached a plow shovel 12 which, as the planter is drawn through a field, serves to open or form a furrow in advance of the feeding mechanism which will be presently described. Side sills 13 are secured at their forward end one to each side of the plow standard or stock 11 at a point directly below the rear end of the beam 10 and these sills extend rearwardly from the said standard in spaced parallel relation with respect to each other and have attached to their rear ends standards 14 at the lower end of which are attached coverer blades 15 which serve to close the furrow opened by the shovel 12, the said sills being braced at their rear ends by means of a cross piece 16. Handles 17 which are two in number are secured one to each side of the draft beam 10 and extend upwardly and rearwardly therefrom in diverging planes and are connected at their upper rear ends by means of a cross bar 18. Secured at their lower ends to the upper side of each of the sills 13 is a pair of uprights 20 which are parallel with respect to each other and which form between them guides, the handles of the machine being also secured to the said uprights and extending across the respective pairs.

The hopper of the machine comprises a front wall 21, an inclined rear wall 22, side walls 23 and a bottom which will be presently specifically described. Fixed upon each of the side walls 23 of the hopper is a slide which is in the nature of a beam 24 each of the beams being received between the uprights of the pair at the corresponding side of the machine as is clearly shown in the side elevation of the drawings.

As clearly shown, the slides not only work between the respective guides but also between the handles and the corresponding sides of the hopper and directly inwardly of of the respective beams 13 the outer side of each of the slides being cut away as indicated by the numeral 25 to provide longitudinal seats adapted to receive the respective beams 13 it being understood that by cutting away the slide, upper and lower shoulders 26 and 27 respectively are formed, the first mentioned shoulders serving to limit the downward sliding movement of the hopper within the frame and the last mentioned shoulders serving to limit its upward sliding movement it being understood that the hopper is freely slidable between these two limits and that it does so slide according to the inequalities in the surface of the ground over which the wheel supporting the hopper travels.

The wheel mentioned above is indicated by the numeral 28 and is journaled for rotation upon a shaft 29 which at its end is fixed in the lower ends of the slides, the wheel being provided with a laterally projecting hub 30 which is formed with a cup or depression 31 the said hub rotating with the wheel and being partly received in the concave underside 32 of a casting 33 which is secured upon the lower end of the hopper the casting being formed through its said end with an opening 34 which registers with the cup in the hub at each revolution of the said hub, it being understood that seeds to be planted are discharged through the opening and into the cup and thrown or dropped from the cup upon further rotation of the wheel. By mounting the hopper for vertical sliding movement within the frame, not only is any interference on the part of the hopper or rather its supporting wheel avoided, but the repeated up and down movement of the hopper serves to loosen the seed and insure their delivery.

What is claimed is:

A corn planter, comprising in combination, a frame including spaced side sills; a pair of spaced parallel uprights mounted upon each sill; a hopper movable freely in a vertical plane and interposed between said pairs of uprights; a vertically-disposed slide secured to each side of said hopper and fitted between the adjacent pair of uprights, said slides extending above and below the sills and being cut away intermediate their ends to provide longitudinal seats adapted to receive said sills, for limiting the upward and downward movement of the hopper; an axle carried by the lower ends of said slides; and a ground wheel carried by the axle.

In testimony whereof, I affix my signature, in presence of two witnesses.

WILLIAM T. GIBBS.

Witnesses:
J. T. McLaughlin,
H. D. Murphy.